United States Patent
Ittel et al.

(10) Patent No.: US 7,402,646 B2
(45) Date of Patent: Jul. 22, 2008

(54) POLYMERIZATION OF DIISOPROPENYLBENZENE

(75) Inventors: Steven Dale Ittel, Wilmington, DE (US); Alexei A. Gridnev, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 435 days.

(21) Appl. No.: 11/140,130

(22) Filed: May 27, 2005

(65) Prior Publication Data

US 2006/0270815 A1 Nov. 30, 2006

(51) Int. Cl.
*C08F 36/20* (2006.01)
*C08F 4/80* (2006.01)
*C07C 13/16* (2006.01)

(52) U.S. Cl. .............. 526/336; 526/135; 526/147; 526/171; 526/219; 526/219.2; 526/905; 525/332.1; 524/577; 585/24; 585/527

(58) Field of Classification Search .............. 526/135, 526/147, 171, 219, 219.2, 336, 905; 524/577; 525/332.1; 585/24, 527
See application file for complete search history.

(56) References Cited

U.S. PATENT DOCUMENTS

| 4,499,248 A | * | 2/1985 | Jalics | 526/173 |
| 5,726,263 A | * | 3/1998 | Gridnev | 526/147 |
| 5,767,211 A |  | 6/1998 | Guan | |

FOREIGN PATENT DOCUMENTS

| GB | 850363 | * | 10/1960 |
| WO | WO96/13527 | * | 5/1996 |

OTHER PUBLICATIONS

U.S. Appl. No. 10/802,024, filed Jun. 16, 2004, Alexei A. Gridnev et al.
Lutz et. al., Anionic Polymerization and Copolymerization of 1,3- and 1,4-Diisopropenylbenzene, Makromolekulare Chemie, 1982, vol. 183:2787-2797.

* cited by examiner

*Primary Examiner*—Fred M Teskin

(57) ABSTRACT

Processes for preparing substantially linear polymers from diisopropenylbenzenes are provided. The polymers are useful in making a variety of products, including coatings, pigment dispersing agents, and stabilizers.

30 Claims, No Drawings

POLYMERIZATION OF DIISOPROPENYLBENZENE

FIELD OF THE INVENTION

The present invention relates to processes for the preparation of substantially linear polymers of diisopropenylbenzenes, and to polymers made by the processes.

BACKGROUND

Linear polymers of di(isopropenyl)benzene (DIPB) are highly unsaturated and may be used as addition fragmentation chain transfer agents in processes of making polymers by free radical polymerization or as reactive, unsaturated backbones for the further elaboration to functional oligomers or polymers. During free radical polymerization reactions, chain transfer agents may be added to propagating radicals and undergo fragmentation to create new radical forms. Molecules such as α-methylstyrene dimer (AMSD), unlike some other chain transfer agents, are easy to handle and generally do not cause discoloration or influence the stability of polymers. However, AMSD has some volatility, particularly when subjected to high temperature curing processes. A polymeric form of AMSD would be more suitable for some applications.

Linear polymers of di(isopropenyl)benzene (DIPB) are highly unsaturated affording multiple sites of reactivity when employed as base polymers for further functionalization. Functionalization reactions include reactions such as hydrocyanation yielding polynitriles, amination yielding polyamines or hydration yielding polyols. Furthermore, the polymers can be self-crosslinked or crosslinked with other materials by cationic reactions One known method of making polymers of di(isopropenyl) benzene is by the anionic method as disclosed by Lutz et. al. (*Makromolekulare Chemie,* 183(11), 2787-97 (1982)), which is suitable for forming relatively small quantities of oligomers of di(isopropenyl)benzene, with low conversions and low molecular weights.

Guan (U.S. Pat. No. 5,767,211 (1998)) has described the synthesis of non-crosslinked, multi-functional, hyper-branched polymers by free radical polymerization of di- or tri-vinyl monomers in the presence of a chain transfer catalyst. The process disclosed herein produces polymers that are substantially linear with few or no points of branching on the polymer backbone.

Issued U.S. Pat. No. 7,022,792, the disclosures of which are hereby incorporated herein by reference in their entirety, discloses the use of hydrogen gas or hydrogen atom donors for the initiation of polymerization of unsaturated monomers in the presence of cobalt chain transfer catalysts.

SUMMARY OF THE INVENTION

One aspect of the present invention is a process for synthesizing substantially linear polymers of di(isopropenyl)benzene, comprising:

a) contacting di(isopropenyl)benzene with a chain transfer catalyst in the presence of a free radical initiator to form a reaction mixture b) heating the reaction mixture to a temperature of from 60° C. to 160° C. in an inert atmosphere; and c) continuing heating the reaction mixture until a conversion of from 70% to 100% is obtained.

Another aspect of the present invention is a process for synthesizing substantially linear polymers of di(isopropyl)benzene, comprising:

a) contacting diisopropenylbenzene with a chain transfer catalyst in the presence of hydrogen gas or a hydrogen atom donor;

b) heating the mixture to a temperature between 60° C. to 160° C. in an inert atmosphere; and c) continuing the heating until a conversion of between 50% to 100% is obtained.

In some embodiments, the processes disclosed herein are carried out in the presence of alpha-methylstyrene derivatives to form copolymers or co-oligomers.

Polymers, including oligomers, formed by the processes, are substantially linear.

These and other embodiments will be apparent to one skilled in the art in view of the following disclosure and the appended claims.

DETAILED DESCRIPTION

The processes disclosed herein provide substantially linear polymers of diisopropenylbenzene. The processes are carried out to a high conversion in an inert atmosphere, at reaction temperatures in the range of 60° C. to 160° C., preferably in the range of 80° C. to 100° C. Because the polymerization processes do not involve cationic species, the resulting oligomers or polymers are substantially free of indanyl functionality. "Substantially free of indanyl functionality" means that any indanyl functionality present is below detectable limits using conventional methods. Preferably less than about 2 mole percent, more preferably no indanyl functionality is present.

In one embodiment, the process begins with combining, in an inert atmosphere, a chain transfer catalyst, a free-radical initiator (e.g., an azo-initiator), a diisopropenylbenzene monomer and optionally other additives (e.g., solvent(s)) in a reactor to form a mixture. The resultant mixture is referred to as the "reaction mixture." By "inert atmosphere" is meant an atmosphere substantially free of oxygen. An inert atmosphere can be provided, for example, by blanketing the mixture with nitrogen, argon, carbon dioxide, or other gas that is unreactive with respect to the reactants. Oxygen can be removed by purging with an inert gas, freeze-pump-thaw cycles, flash evacuation, or other methods known to those skilled in the art. The reactants are generally mixed, usually for several minutes, before being heated, to ensure the catalyst and radical initiator are dissolved, i.e., in solution in the reactants. The mixture is then heated to begin decomposition of the radical initiator and initiation of the polymerization reaction. The monomers can include monofunctional comonomers that are incorporated at the ends of the polymer chain.

In an alternative process, no radical initiator is used and the mixture is heated in an atmosphere of hydrogen gas or in the presence of a hydrogen atom donor.

The details of a similar, initiator-free process are disclosed in detail in U.S. Pat. No.7022792,already incorporated herein by reference.

Preferred "chain transfer catalysts" for use in the processes disclosed herein include cobalt (II) and cobalt (III) macrocyclic chelates, particularly substituted cobalt glyoximes and substituted cobalt porphyrins. Examples of such cobalt compounds and their structure are disclosed in Gridnev and Ittel (*Chem. Rev.,* 101(12), 3611-3659 (2001)) or Davis et al. (*J. Macromol. Sci. -Rev. Macromol. Chem. Phys.,* C34(1), 243-324 (1994)); the disclosures of which are hereby incorporated herein by reference in their entirety. Additional examples of such cobalt chain transfer catalysts are disclosed in U.S. Pat. No. 4,680,352 U.S. Pat. No. 4,694,054; U.S. Pat. No. 5,324,879; WO 87103605; U.S. Pat. No. 5,362,826; U.S. Pat. No. 5,264,530; U.S. Pat. No. 6,740,618; and U.S. Pat. No. 6,858,745. Other useful cobalt compounds (cobalt complexes of porphyrins, phthalocyanines, tetraazoporphyrins, and cobaloximes) are disclosed in USSR Patent 664,434 USSR Patent 856,096 USSR Patent 871,378 and USSR Patent 1,306,085. Complexes of other transition metals have been reported to be active in chain transfer catalysis and may be employed in the processes disclosed herein but the cobalt catalysts are preferred.

Examples of cobalt(II) and cobalt(III) chain transfer catalysts based upon a glyoxime ligand include those represented by structure 1.

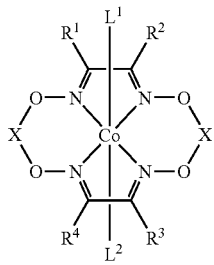

1

Referring to structure 1, X can be hydrogen or $BR^{20}R^{21}$, where $R^{20}$ and $R^{21}$ are each independently selected from unsubstituted and substituted aryl, unsubstituted and substituted $C_1$-$C_{50}$ alkyl, unsubstituted and substituted $C_1$-$C_{50}$ alkoxy, unsubstituted and substituted aryloxy, and halogens. Preferably X is hydrogen or $BF_2$. $R^1$, $R^2$, $R^3$ and $R^4$ are independently selected from aryl, substituted aryl, alkyl, substituted alkyl methyl, ethyl, or —$(CH_2)_4$—. $R^1$, $R^2$, $R^3$, and $R^4$ are preferably independently selected from phenyl, substituted phenyl, methyl, ethyl, or —$(CH_2)_4$—. When cobalt is in the divalent state, $L^1$ and $L^2$ can be any one of a variety of neutral ligands c known in coordination chemistry by those skilled in the art, and can be selected from water, amines, ammonia, nitrogen heterocycles, and phosphines In some embodiments, one or both of $L^1$ and $L^2$ are absent. When cobalt is in the trivalent state, $L^1$ is an organic radical and is preferably selected from isopropyl, 1-cyanoethyl, 1-carbomethoxyethyl and 1-carbo(2-methoxyethoxy)ethyl. $L^1$ can also be selected from alkyl, substituted alkyl or halogen. When cobalt is in the trivalent state, $L^2$ can be any one of a variety of neutral ligands commonly known in coordination chemistry and can be selected from water, amines, ammonia, nitrogen heterocycles, and phosphines or may be absent. Specific examples of catalysts are given in Table 1. Other catalysts that can be used will be apparent to one skilled in the art.

TABLE 1

Examples of catalyst structures having formula 1.

| Catalyst designator | $R^1$, $R^2$, $R^3$, $R^4$ | $L^1$ | $L^2$ | X |
|---|---|---|---|---|
| Cobalt(II) | | | | |
| $Co^{II}(DPG)_2$ | Ph, Ph, Ph, Ph | $H_2O$ | $H_2O$ | H |
| $Co^{II}(DMG\text{-}BF_2)_2$ | Me, Me, Me, Me | $H_2O$ | $H_2O$ | $BF_2$ |
| $PyCo^{II}(MEG)_2$ | Me, Et, Me, Et | Pyridine | — | H |
| Cobalt(III) | | | | |
| $iPrCo^{III}(DMG\text{-}BF_2)_2(H_2O)$ | Me, Me, Me, Me | $(CH_3)_2CH$— | $H_2O$ | $BF_2$ |
| $ACNCo^{III}(DMG\text{-}BF_2)_2$ | Me, Me, Me, Me | $(CH_3)(CN)CH$— | | $BF_2$ |
| $MeOEACo^{III}(DMG)_2$ | Me, Me, Me, Me | $(CH_3)(CO_2C_2H_4OCH_3)CH$— | | H |

The catalysts can be named more rigorously, using nomenclature known to those skilled in the art. For example the catalyst indicated as $iPrCo^{III}(DMG\text{-}BF_2)_2$ above is more properly represented by the chemical name (Bis-[(1,2-dimethyl-ethanedioximato)(2-)O:O'-bis(difluoroborato(2-))-N'N"N'"N""](2-propyl)cobalt(III)).

Other catalysts that can be used include those having structure 2.

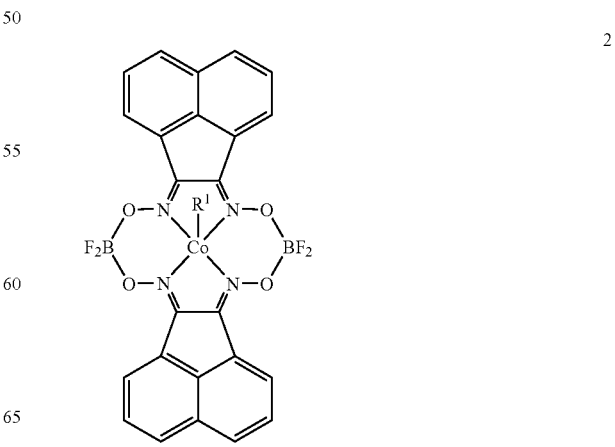

2

As shown in 2, when geminal, the $R^{1-4}$ substituents can be combined in a cyclic structure.

Other suitable catalysts include cobalt complexes of a variety of tetra(aryl) porphryins, wherein aryl is substituted or unsubstituted, such as tetraphenylporphyrin, tetraanisylporphyrin

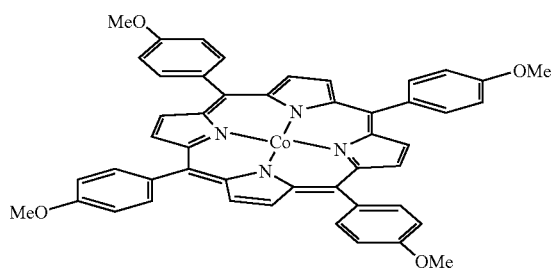

tetramesitylporphyrin

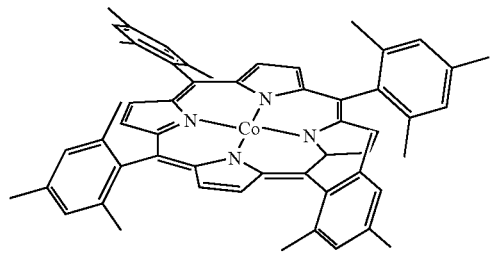

and other related species.

The reaction mixture used in the processes disclosed herein can comprise from about 1 part per million to about 10 parts per thousand by weight of catalyst, preferably from about 100 parts per million to 1 part per thousand by weight, based on the total weight of the reaction mixture. Cobalt catalysts are selected for use in a particular polymerization process, in part, based on factors such as solubility, activity and lifetime for the chosen temperature and solvent; such a selection can be made by one skilled in the art. One or more cobalt catalysts can be used in a polymerization process.

When free radical initiators are used in the processes disclosed herein for making oligomers and polymers, it is preferable to use one that produces carbon-centered radicals that are sufficiently mild that they do not destroy the metal chelate chain transfer catalysts. Suitable free-radical initiators include alkyl azo compounds soluble in the reaction mixture and having an appropriate half-life for the reaction time and temperature chosen for the reaction. Specific examples of free radical initiators include: azocumene; 2,2'-azobis(2-methyl)-butanenitrile; 2,2'-azobis (isobutyronitrile) (AIBN); 4,4'-azo-bis(4-cyanovaleric acid); 2-(t-butylazo)-2-cyanopropane; 1,1'-azobis(cyclohexane-1-carbonitrile) and other azo compounds known to those skilled in the art. The reaction mixture can comprise approximately 0.01% to approximately 10% by weight, preferably approximately 0.5% to approximately 3% by weight of azo-initiator. Azo-initiators are selected for a particular polymerization process, in part, based primarily on the recommended reaction temperature. One or more azo-initiators can be used in a polymerization process.

Other methods known to those skilled in the art for initiating radical polymerization can be used in the processes disclosed herein, in conjunction with the chain transfer catalysts and in place of the azo initiators. The polymerization processes may be initiated using an external source such as ultraviolet light, visible light, electron beam, or combinations thereof, for example.

One preferred method for initiating the polymerization is to employ hydrogen gas or a hydrogen atom donor molecule in the presence of the chain transfer catalysts. A "hydrogen atom donor molecule", D-H, is a molecule capable of readily donating a hydrogen atom to the metal center of the chain transfer catalyst. In the processes disclosed herein, a hydrogen donor D-H is one wherein the corresponding organic radical D. has a stability at least several hundred times greater than that of a primary alkyl radical (e.g., ethyl radical) and less than 6000 times that of a primary alkyl radical. Methods for determining stability (or reactivity) are well known in the art. A suitable method is disclosed, for example, in *Radicals*, Vol. 1, Jay K. Kochi, John Wiley and Sons, 1973, N.Y., N.Y., pp. 302-03. The stability measured is the stability of the radical D. (i.e., the radical resulting from removal of H. from D-H) as compared to the stability or reactivity of a primary alkyl radical.

Hydrogen atom donor compounds include such diverse chemical classes of materials as stannanes, silanes, benzhydrols, diarylphosphines, triarylmethanes, N,ω-dialkylpiperizines, 3-pyrrolines, xanthenes, 9,10-dihydroanthracenes, 9-hydroxyfluorenes, aryl-β-ketoesters, aldehydes, benzylic alcohols, alkyl-β-ketoesters, oximes (such as acetophenone oxime and benzaldehyde oxime), and amidoximes (such as caprolactam oxime). Specific examples of hydrogen atom donors include but are not limited to: tributyltin hydride, triethylsilane, benzhydrol, triphenylmethane, N,N'-dimethylpiperazine, xanthene, 9,10-dihydroanthracene, 1,2-dihydronaphthalene, 9-hydroxyfluorene, pivaldehyde, ethyl benzoylacetate, or ethyl isobuterylacetate. Molecules such as 3-pyrroline or diphenylphosphine and related species can serve as hydrogen atom donors but coordination of their nitrogen or phosphorus lone pair electrons to the metal center may interfere with the catalytic chain transfer process, so these donors are generally not preferred.

The reaction mixture comprises DIPB monomer and optionally a solvent. Suitable solvents include any liquid suitable for free-radical polymerization, in which the components of the reaction mixture are soluble. Suitable solvents include, but are not limited to, ketones such as acetone, butanone, pentanone and hexanone; alcohols such as isopropanol; amides such as dimethyl formamide; aromatic hydrocarbons such as toluene and xylene; ethers such as tetrahydrofuran and diethyl ether; ethylene glycol; glycol ethers, alkyl esters or mixed ester ethers such as monoalkyl ether-monoalkanoates; and supercritical fluids such as supercritical carbon dioxide. The reaction mixture may comprise two or more solvents. A reaction mixture can comprise approximately 1% to approximately 100% by weight, preferably approximately 30% to approximately 100% by weight of DIPB monomer, based on the total weight of the reaction mixture.

The reaction mixture can optionally contain monofunctional comonomers. "Monofunctional comonomers" are comonomers that react in the same manner as DIPB, but have only one isopropenyl or similar functional group. Monofunctional comonomers include α-methylstyrenes. Alpha-methylstyrene (AMS) monomers are selected on the basis of the desired functionality of the resulting oligomer or polymer. For example, an oligomer or polymer containing isocyanate functional end group may be prepared from an alpha-methylstyrene monomer comprising an isocyanate group. The aromatic ring of an alpha-methylstyrene monomer may contain one or more functional groups. One or more alpha-methylstyrene monomers may be used in the polymerization process so long as they are chemically compatible. The functional groups located on each ring can be all the same, all different, or a combination of functional groups that are different. Preferred alpha-methylstyrene monomers include unsubstituted AMS, 2-amino-AMS, 3-(2-isocyano-2-propyl)AMS, 4-methylAMS, 4-chloroAMS, 4-fluoroAMS and 2-isopropenyl-naphthalene on the basis of their commercial availability. A reaction mixture can comprise approximately 1% to approximately 50% by weight, preferably approximately 20% to approximately 50% by weight of alpha-methylstyrene monomer, based on the total weight of the reaction mixture.

The reaction mixture is heated to a reaction temperature in the range of about 60° C. to about 160° C., preferably in the range of 80° C. to about 120° C. The reaction mixture may be heated using any heating method that is known by one skilled in the art. The reaction mixture is maintained at the elevated temperature for at least 5 minutes, and can be maintained at the elevated temperature for a day, even 5 days, and even up to 10 days, or longer, depending upon the reactants and conditions employed. Preferably the temperature is maintained for a period of about 30 minutes to about 12 hours and a solution comprising oligomers or polymers is formed. Stepwise heating, in which the reaction mixture is elevated to different temperatures for specified periods of time, or continuous ramp heating in which the temperature is varied continuously with time can also be used.

"Conversion" of the reaction refers to the percent of the DIPB that is converted into oligomers or polymers. Conversion can be monitored by gas chromatography (GC), high-pressure liquid chromatography (HPLC) or gel permeation chromatography (GPC) by watching the disappearance of the starting DIPB. GPC and HPLC also allow the observation of the formation of the higher molecular weight products. In copolymerizations, conversion, as used herein, is the percent of the DIPB that is converted to oligomer. At any given point in the reaction, conversion of the comonomer may be higher or lower than that of the DIPB, but it is not considered in determining conversion. By "high conversion" is meant a degree of conversion of 70% or greater.

The term "polymer," as used herein, includes oligomers and polymers of DIPB having a degree of polymerization of at least three. In general the molecular weight of polymers is from several hundred, e.g., 475 and greater to several thousand or even tens of thousands. In contrast to conventional free radical polymerizations in which high molecular weight polymer is observed even at very low conversions, the molecular weights of polymers made according to the present processes are dependent upon the rate of conversion. In this regard, the polymers behave more like those made by condensation polymerization than those made by conventional free radical polymerization.

A general structure of a polymer made from 1,3-DIPB homopolymerization according to the present processes is given by

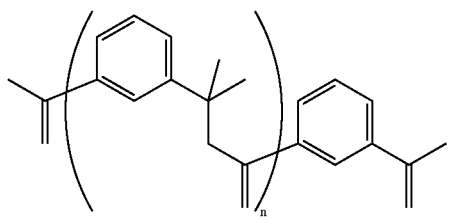

where n is an integer of 2 or greater, preferably up to 1000, more preferably from 2 to 100, even more preferably from 2 to 100. Each unit of DIPB incorporated into the polymer yields one unsaturated group. In addition, there is one additional unsaturated group in the overall polymer structure. However, this general structure is not meant to imply a particular regioregularity of the polymer chain. For example, in the most simple case of a trimer, three expected products can be formed. The first is the unsymmetrical adduct having the structure:

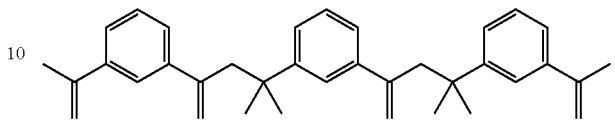

Also possible are two symmetrical products having structures

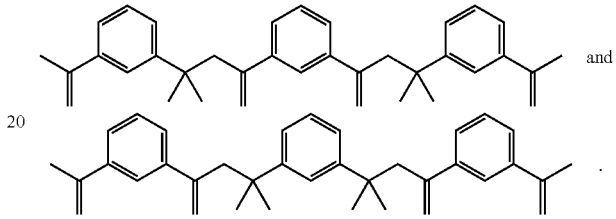

It is expected that higher oligomers or polymers can incorporate all of these isomeric structures in a random manner. Polymers having similar structures but containing 1,2- or 1,4-linkages at the aromatic ring are obtained when the polymerizations are carried out with 1, 2 or 1,4-DIPB.

By "substantially linear" is meant a polymer having, ideally, no branches. However, "substantially linear," as used herein, is intended to include those polymers having no more than one branch per five DIPB units.

Unless otherwise specified, "percentages", as used herein, are weight percentages, based on the total weight of the composition, e.g., reaction mixture, being referenced. In a percent conversion, as reported herein, a reported percentage is the percent by weight of a particular starting material, e.g., monomer, being converted. In referring to the number of linkages in a polymer backbone, percentages refer to the number of such linkages relative to the total number of linkages.

By "diisopropenylbenzene" or "DIPB" is meant primarily 1,3-DIPB, but it also includes the 1,2- and 1,4 isomers.

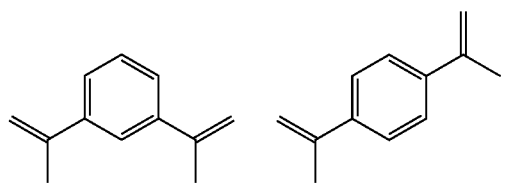

1,3-DIPB           1,4-DIPB

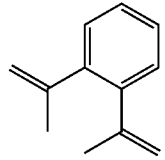

1,2-DIPB

The term DIPB also includes mixtures of two or more isomers of DIPB. Though not readily available on a commercial basis, DIPB is also meant to include all other aromatic molecules having two isopropenyl substituents. Thus 2,6-di(isopropenyl)naphthalene and other di(isopropenyl)naphthalene isomers, 3,3'-di(isopropenyl)biphenyl and other di(isopropenyl) biphenyl isomers are expected to provide similar results to 1,3-DIPB when employed in the processes disclosed herein.

Copolymers of DIPB with monofunctional comonomers such as AMS have the monofunctional comonomer incorporated as a terminal unit. For example, if the AMS employed is substituted on the phenyl ring, that substituent, R, will be incorporated on the terminal phenyl group

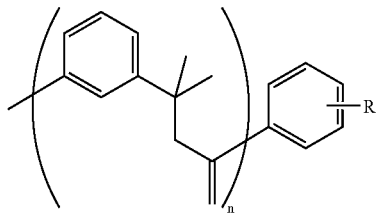

where n is an integer of 2 or greater. Thus it is possible to selectively functionalize the resulting co-oligomers or copolymers. Because the polymerization has many of the characteristics of a condensation polymerization, the incorporation of monofunctional comonomers can be used to limit or control the molecular weight of the resulting product.

By "indanyl functionality" is meant the product of cationic ring closure of the structures shown above to give the structure

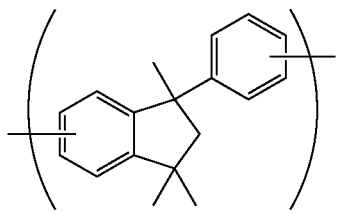

whose name is based upon the hydrocarbon, indan. In some polymerization processes, particularly those carried out by cationic methods as opposed to the free radical methods disclosed herein, the indanyl structure may constitute up to 20% of the linkages in the polymer backbone. A polymer said to be "free of indanyl functionality", such as those disclosed herein, preferably has fewer than 2% indanyl linkages. It is highly preferred that the concentration of indanyl groups in the polymers be undetectable by NMR spectroscopic methods.

The polymers made by the processes disclosed herein are typically prepared using standard solution polymerization techniques, but can also be prepared using emulsion, suspension or bulk polymerization processes. The polymerization can be carried out as a batch, semi-batch, or continuous process (CSTR). In a batch process, the reaction can be run under pressure to avoid monomer reflux.

The free DIPB or comonomers not incorporated into oligomers or polymers can be removed from the polymer solution by separation techniques well known to those skilled in the art. The preferred separation technique is vacuum distillation, which removes unreacted monomer, solvent and other volatiles from the reaction products. Filtration or chromatography through beds of carbon black, alumina, silica gel or other absorbents may be useful to remove color resulting from catalyst or byproducts ("decolorization").

The poly(diisopropenylbenzene)s prepared according to the processes disclosed herein can be used as non-metallic chain transfer agents, and as components or intermediates in the production of graft copolymers, non-aqueous dispersed polymers, block copolymers, microgels, star polymers, branched polymers, and ladder polymers such as those utilized in automotive finishes and other applications. Paints and other protective finishes are often formulated with VOCs ("volatile organic compounds") or solvents to improve performance and durability. Cleanup also requires toxic solvents that release additional VOC pollutants. However, increased awareness of possible health risks and overall air quality concerns has led to a demand for products lower in VOCs. Products may be described as "low VOC" when they off-gas significantly less than products made with conventional carriers or materials. Some solvent-based paints qualify as low-VOC because their formulas have been modified so that the active components are liquids that also serve as solvent during application. VOC levels are expressed in pounds per gallon (lbs/gal) or grams per liter (g/l). More specifically, "low VOC" coating composition means a coating composition that includes less than 0.6 kilograms of organic solvent per liter (5 pounds per gallon) of the composition, as determined under the procedure of ASTM D3960.

The poly(diisopropenylbenzene) products of the processes disclosed herein can be employed as polymeric chain transfer agents in subsequent polymerization processes. Their chain transfer capabilities are similar to those of the well-known dimers of α-methylstyrene, but the poly(diisopropenylbenzene)s have the advantage of lower volatility, thereby reducing odor and the VOC of automotive finishes. When utilized as chain transfer agents, the poly(diisopropenylbenzene)s also have the ability to act as links between oligomers.

Polymers prepared using the poly(diisopropenylbenzene)s disclosed herein can be in the form of a solution or a dispersion of polymer particles. The polymers have a wide variety of applications and can be used, for example, in the formulation of coatings such as automotive finishes. For use in coating or paint formulations, a polymer is desirably substantially thermoplastic or substantially uncrosslinked when applied to a substrate surface, prior to the formation of a more durable, cured coating. A cured coating is formed when the polymer hardens through gellation or crosslinking. Crosslinking or gelling of the polymer composition can be induced by adding reactive diluents comprising ethylenically unsaturated groups, and/or multi-ethylenically unsaturated monomers such as those prepared by the processes disclosed herein, to the paint formulation. Multi-etheyleneically unsaturated monomers for use in crosslinking the polymers preferably are in an amount from about 0.01% to about 5% by weight, based on the total weight of the polymer in the formulation. Preferred multi-ethylenically-unsaturated monomers include allyl methacrylate, trimethylolpropane triacrylate, diallyl phthalate, 1,4-butylene glycol dimethacrylate, 1,6-hexanedioldiacrylate and divinyl benzene. The multi-ethylenically-unsaturated monomers are selected so that film formation is not materially impaired. Curing or crosslinking initiators useful in the hardening process include conventional free radical initiators, such as, azo-initiators, hydrogen peroxide, benzoyl peroxide, t-butyl hydroperoxide, t-butyl peroctoate, ammonium, alkali persulfates and combinations thereof. Preferably the initiator is used in a concentration from about 0.05% to about 3.0% by weight, based on the weight of the polymer. Initiation can be enhanced by the use of external sources such as heat, ultraviolet light, electron beam or other sources known to those skilled in the art.

Curing or crosslinking of coating compositions can be catalyzed by Lewis acid or protic acid compounds. Tin compounds such as $SnCl_4$ are commonly employed for cationic crosslinking as are lanthanide salts, antimony compounds and titanates. Toluene sulfonic acid or other organic strong acids can also be employed as a non-metallic catalyst. It is also preferred that coatings made from polymers prepared according to the processes disclosed herein are high solids compositions. "High solids coating composition means a coating composition having solid component of 40 percent or more, preferably in the range of from 45 to 85 percent and more preferably in the range of from 50 to 65 percent, all in weight percentages based on the total weight of a polymer composition. A coating composition containing the polymer prepared by the processes disclosed herein can also contain conventional additives, such as, reactive diluents, pigments, stabilizers, flow agents, toughening agents, fillers, durability agents, corrosion and oxidation inhibitors, rheology control agents, metallic flakes and other additives. Such additives can be selected by one skilled in the art, based on the intended use of the coating composition. Fillers, pigments, and other additives that can adversely effect the clarity of a cured coating are not desirable if the composition is intended as a clear coating. The coatings can be used as automotive coatings, such as refinishes, primers, basecoats, undercoats, overcoats and clear coats.

The polymers are also suitable for use in compositions for maintenance finishes for a wide variety of substrates, such as steel, copper, brass and aluminum or non-metallic substrates, such as, wood, leather, polymeric materials and concrete.

EXAMPLES

The examples below are carried out using standard techniques, which are well known and routine to those skilled in the art, except where otherwise described in detail. These examples are illustrative, but do not limit the invention.

The freeze-pump-thaw cycle as used in the examples below is described in D. F. Shriver, et al., "The Manipulation of Air Sensitive Compounds", 2nd ed., Wiley Interscience, 1986. $^1$H-NMR spectra were taken on a QE300 NMR spectrometer (General Electric Co., Freemont, Calif. 94539) at 300 MHz frequency. Molecular weight (MW) and Degrees of Polymerization (DP) measurements were based on size exclusion chromatography (SEC) using polystyrene as a standard, and performed on a WISP 712 Chromatograph with 100A, 500A, 1000A and 5000A phenogel columns (Waters Corp., Marlborough, Mass.). Unless otherwise specified, all chemicals and reagents were used as received from Aldrich Chemical Company, Milwaukee, Wis.

Example 1

Homopolymerization of 1,3-Diisopropenylbenzene with Azo Initiator

To a 250 mL 3-neck flask equipped with thermocouple, stir bar, and septum was added uninhibited 1,3-diisopropenyl benzene (190 mL, Aldrich, Milwaukee, Wis.), a cobalt chain transfer catalyst MeOEACo$^{III}$(DMG)$_2$ (115 mg, Marshall Lab, Philadelphia, Pa.), Vazo(R) 64 (570 mg, DuPont, Wilmington, Del.), and 1,2-dichloroethane (40 mL, Aldrich, Milwaukee, Wis.). A condenser was connected to the flask and the solution was degassed with argon for 45 min. before heating to 100° C. under continuous, minimal nitrogen bubbling for 6 h. The cooled solution was diluted with hexane (200 mL, EMD Chemicals Inc., Gibbstown, N.J.) and filtered over silica gel to remove catalyst. Hexane was evaporated leaving a colorless liquid.

GPC of the reaction mixture gave relative intensities of dimer, trimer, tetramer and pentamer of 100 to 20 to 5 to 1 at a conversion of approximately 50%. Results are shown in Table 2.

Example 2

Homopolymerization of 1,3-Diisopropenylbenzene with Hydrogen

To a 250 mL 3-neck flask equipped with thermocouple, stir bar, and septum was added uninhibited 1,3-diisopropenyl benzene (190 mL, Aldrich, Milwaukee, Wis.), a cobalt chain transfer catalyst MeOEACo$^{III}$(DMG)$_2$ (115 mg, Marshall Lab, Philadelphia, Pa.), and 1,2-dichloroethane (40 mL, Aldrich, Milwaukee, Wis.). A condenser was connected to the flask and the solution was degassed with argon for 20 min. followed by hydrogen for 45 min. before heating to 100° C. under minimal hydrogen flow for about 18 h. The cooled solution was diluted with hexane (200 mL, EMD Chemicals Inc., Gibbstown, N.J.) and filtered over silica gel to remove catalyst. Hexane was evaporated leaving a colorless, viscous polymer.

The high oligomer nature of the homopolymer product is indicated by the GPC results in Table 2 where the higher species are quite evident. The same type of distribution is observed in the mass spectrum where it is also noted that the masses observed correspond precisely to (DIPB)$_n$ with no additional end groups visible.

TABLE 2

Observed masses and relative peak heights for Examples 2 and 3.

| | | Relative Height | |
|---|---|---|---|
| DP | Mass | Ex 2 | Ex 3 |
| 4 | 655 | 100 | 100 |
| 5 | 813 | 35 | 54 |
| 6 | 971 | 20 | 33 |
| 7 | 1129 | 10 | 20 |
| 8 | 1287 | | 16 |
| 9 | 1445 | | 12 |
| 10 | 1603 | | 9 |
| 11 | 1761 | | 6 |
| 12 | 1919 | | 4 |
| 13 | 2077 | | 3 |
| 14 | 2235 | | 3 |
| 15 | 2393 | | 2 |
| 16 | 2551 | | 2 |
| 17 | 2709 | | 1 |
| 18 | 2867 | | 1 |
| 19 | 3025 | | 1 |
| 20 | 3183 | | 1 |
| 21 | 3341 | | <1 |
| 22 | 3499 | | <1 |

Example 3

Homopolymerization of 1,3-Diisopropenylbenzene to High Conversion

To a 250 mL 3-neck flask equipped with thermocouple, stir bar, and septum was added uninhibited 1,3-diisopropenyl benzene (190 mL, Aldrich, Milwaukee, Wis.), the cobalt chain transfer catalyst, MeOEACo$^{III}$(DMG)$_2$ (115 mg, DuPont Co., Philadelphia, Pa.), and 1,2-dichlorethane (40 mL, Aldrich, Milwaukee, Wis.). A condenser was connected to the flask and the solution was degassed with argon for 20 min. followed by hydrogen for 45 min. before heating to 100° C. under continuous, minimal hydrogen bubbling for about 18 h resulting in a viscous, orange polymer.

The higher MW polymer was not entirely soluble in hexane so the catalyst removal step was not carried out. GPC indicates a molecular weight (Mw) of 2000 with appreciable mass out to 10,000. The monomer peak indicates that conversion was greater then 95%. The distribution of products by mass spectroscopy is indicated in Table 2.

Example 4

Copolymerization of 1,3-Diisopropenyl Benzene with α-Methylstyrene

To a 250 mL 3-neck flask equipped with thermocouple, stir bar, and septum was added uninhibited 1,3-diisopropenyl benzene (66 mL, Aldrich, Milwaukee, Wis.), alpha-methylstyrene (50 mL, Aldrich, Milwaukee, Wis.), a cobalt chain transfer catalyst MeOEACo$^{III}$(DMG)$_2$ (70 mg, DuPont Co., Philadelphia, Pa.), and 1,2-dichloroethane (30 mL, Aldrich, Milwaukee, Wis.). A condenser was connected to the flask and the solution was degassed with argon for 20 min. followed by hydrogen for 45 min. before heating to 100° C. under continuous, hydrogen bubbling for about 12 h. The cooled solution was diluted with hexane (200 mL, EMD Chemicals Inc., Gibbstown, N.J.) and filtered over silica gel to remove catalyst. Hexane was evaporated leaving a colorless liquid.

By GPC, the predominant species are the homo and mixed products from dimers through tetramers, but there are appreciable quantities of polymer out to a molecular weight of 2000. The mass spectrum gives a more detailed look at the composition. Masses below 500 are complicated by noise and ions from the substrate. Table 3 shows the observed masses (monomers plus one sodium ion) and the relative peak heights, indicating relative abundance of each of the observed masses.

TABLE 3

Observed masses and relative intensities for Example 4.

| Number of DIPB | Number of AMS | | | | | | | |
|---|---|---|---|---|---|---|---|---|
| | 0 Mass | Rel. Height | 1 Mass | Rel Height | 2 Mass | Rel Height | 3 Mass | Rel Height |
| 2 | — | | — | | 575 | 80 | 693 | 4 |
| 3 | — | | 615 | 100 | 733 | 50 | 851 | 4 |
| 4 | 655 | 55 | 773 | 55 | 891 | 18 | 1009 | 4 |
| 5 | 813 | 18 | 931 | 24 | 1049 | 10 | 1167 | 2 |
| 6 | 971 | 8 | 1089 | 12 | 1207 | 4 | 1325 | 1 |
| 7 | 1129 | 5 | 1247 | 5 | 1365 | 3 | 1483 | 1 |
| 8 | 1287 | 2 | 1405 | 3 | 1523 | 2 | 1641 | 1 |
| 9 | 1445 | 2 | 1563 | 2 | 1681 | 1 | 1799 | <1 |
| 10 | 1603 | 1 | 1721 | 1 | 1839 | 1 | 1957 | |
| 11 | 1761 | | 1879 | 1 | 1997 | <1 | 2115 | |
| 12 | 1919 | | 2037 | <1 | 2155 | | 2273 | |

It can be seen that the most abundant species are those with one or two AMS monomers incorporated, and the next most abundant species have no AMS incorporated. In keeping with the substantially linear nature of the products, there is a very small quantity of material with three AMS incorporated; because incorporation of AMS is substantially entirely at the ends of chains, the incorporation of three AMS units probably indicates a low level of branching to achieve third ends. No species with more than three AMS were observed at any level of DIPB.

Example 5

Homo-Oligomerization of DIPB

A sample of the chain transfer catalyst MeOEACo$^{III}$(DMG)$_2$ (115 mg) was dissolved in 15 mL of 1,2-dichloroethane (DCE) and was added to a solution of DIPB (190 mL, inhibitor removed by passing through Al$_2$O$_3$ column) and DCE (40 mL). The solution was degassed by bubbling with argon for 10 min and then H$_2$ for 45 min. The oligomerization was conducted at 100° C. (the timing was started when T reached 85° C.) for 3-hrs. H$_2$ was bubbled through the solution during the entire course of the reaction. Then 115 mg of additional catalyst in 40 ml of DCE was added after 5.5 hrs of reaction and after 7.5-hrs the oligomerization was stopped.

After the oligomerization was completed, the reaction mixture was diluted with 200 ml of hexane and then was passed through a column of silica gel. The resulting colorless solution was evaporated to remove hexane and DCE (90° C., using a Rotovap and water aspirator). Hydroquinone was added as a stabilizer.

The oligomer was analyzed by $^1$H and $^{13}$C NMR and GPC. The NMR spectra data were consistent with the expected structure. The GPC data are indicated a 98% yield of oligomer; the Mn of ODIPB was 480 with PDI of 2,4. The DP of oligomerization was 3.0.

General Method for Cationic Crosslinking of DIPB Oligomers

The cationic crosslinking of bulk DIPB oligomers from Example 1 was conducted at 20° C. under an argon atmosphere in bulk of ODIPB in the presence of three catalytic systems. Those systems, I, II and III, were:

I. SnCl$_4$ in 1,2-dichloroethane (DCE)-(H$_2$O) ([I]$_0$=0.38 mol/l)

II. SnCl$_4$ in hexane-(H$_2$O) ([II]$_0$=0.38 mol/l)

III. p-CH$_3$C$_6$H$_4$SO$_3$H (PTSA)-toluene ([III]$_0$=1.20 mol/l)

Initial solutions of the catalytic systems (with [I]$_0$, [II]$_0$ and [III]$_0$) were prepared and were kept under an argon atmosphere in the Schlenk glassware. The saturated solution of PTSA in toluene was prepared by refluxing "PTSA-hydrate" in toluene for 3 hr at 120° C. using an azeotropic boiling apparatus similar to a Dean Stark trap.

In a typical example of crosslinking in bulk of polyDIPB cationically, 5 ml of DIPB oligomer (de-inhibited by passing through an Al$_2$O$_3$ column) was added to reaction flask containing a magnetic stirrer and blanketed with an argon atmosphere. Under a current of argon, the necessary amount of catalyst solution (≈0.1 ml or less) was transferred from the Schlenk flask by micropipette and was added to the bulk polyDIPB. The volume of solvent (S) did not exceed 5% by volume of the polyDIPB. The crosslinking was conducted at 20° C.

After rapid mixing, the solution poured into a viscometer tube connected with a reactor and supplied with a small steel ball. With the help of a ball and an external magnet the time of fall of the ball in the solution (t$_x$) between two marks on the tube was measured.

The time of fall of a ball in pure oligomer (t$_0$)=0.01 min. The times of full system crosslinking (t$_f$) reported below are the time at which the ball no longer fell and they show the dependence of (t$_f$) versus catalyst type and concentration.

Example 6

Crosslinking of Bulk polyDIPB with SnCl$_4$-DCE

Bulk polyDIPB was crosslinked with various concentrations of catalyst system I, "SnCl$_4$-DCE-(H$_2$O)". The Table shows the catalyst concentrations, the added quantity of dichloroethane cosolvent, and the time to total crosslinking. It is clear that the system crosslinks quickly with the tin catalyst.

TABLE 4

Times to total crosslinking as a function of catalyst concentration for Example 6.

| [cat]$_0$, mol/l | S, % vol. | t$_f$, min. |
| --- | --- | --- |
| 7.5 | 2 | 0, .5 |
| 3.8 | 1 | 1.25 |
| 2.3 | 0.6 | 2.0 |
| 1.0 | 0.3 | 3.0 |

Example 7

Crosslinking of Bulk polyDIPB with SnCl$_4$-Hexane

Bulk polyDIPB was crosslinked with various concentrations of catalyst system II, "SnCl$_4$-hexane-(H$_2$O)". The Table shows the catalyst concentrations, the added quantity of hexane cosolvent, and the time to total crosslinking. It is clear that the system crosslinks quickly with the tin catalyst, but not as fast as the dichloroethane system.

TABLE 5

Times to total crosslinking as a function of catalyst concentration for Example 7.

| [cat]$_0$, mol/l | S, % vol. | t$_f$, min. |
| --- | --- | --- |
| 7.5 | 2 | 2.8 |
| 3, .8 | 1 | 8.5 |
| 2.8 | 0.7 | 38 |
| 2.3 | 0.6 | 72 |

Example 8

Crosslinking of bulk polyDIPB with PTSA-Toluene

Bulk polyDIPB was crosslinked with various concentrations of catalyst system III, "PTSA-Toluene". The Table shows the catalyst concentrations, the added quantity of cosolvent, and the time to total crosslinking. The data show that crosslinking occurs more slowly than with either of the tin catalysts and that higher catalyst concentrations are required.

TABLE 6

Times to total crosslinking as a function of catalyst concentration for Example 8.

| [cat]$_0$, mol/l | S, % vol. | t$_f$, min. |
| --- | --- | --- |
| 46.2 | 3.8 | 0.5 |
| 23.5 | 2.0 | 2.8 |
| 17.0 | 5.7 | 9.4 |
| 14.8 | 4.9 | 11.7 |
| 12.9 | 4.3 | 85 |
| 11.5 | 3.8 | 150 |
| 5.9 | 2.00 | No crosslinking in 72 hrs |

What is claimed is:

1. A process for preparing a substantially linear polymer of di(isopropenyl)benzene of the formula:

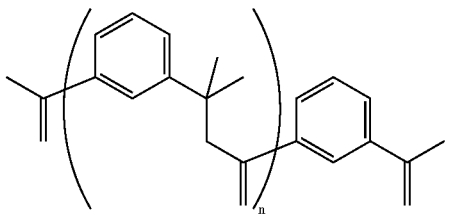

wherein n is an integer of 2 or greater, comprising:
   a) contacting a reaction mixture of meta-diisopropenylbenzene with a chain transfer catalyst in the presence of a free radical initiator, a hydrogen atom donor, or hydrogen gas to form a reaction mixture;
   b) heating the reaction mixture to a temperature from about 60° C. to about 160° C.;
   c) maintaining the reaction temperature until a conversion of from 70% to 100% is achieved, and
   d) isolating said substantially linear polymer of diisopropenylbenzene.

2. The process of claim 1 wherein the reaction mixture further comprises a solvent.

3. The process of claim 1 wherein the reaction mixture is heated to a temperature from about 80° C. to about 120° C.

4. The process of claim 1 wherein the conversion is from about 90 to about 100%.

5. The process of claim 1 wherein the reaction mixture further comprises one or more monofunctional comonomers.

6. The process of claim 5 wherein the monofunctional comonomer is α-methylstyrene.

7. The process of claim 5 wherein the monofunctional comonomer is a substituted α-methylstyrene.

8. The process of claim 1 wherein the process is carried out in the presence of hydrogen gas.

9. The process of claim 1 wherein the free radical initiator is selected from azcumene; 2,2'-azobis(2-methyl)-butanenitrile; 2,2'-azobis (isobutyronitrile); 4,4'-azobis(4-cyanovaleric acid); 2-(t-butylazo)-2-cyanopropane; 1,1'-azobis(cyclohexane-1-carbonitrile), and combinations thereof.

10. The process of claim 1 wherein the chain transfer catalyst is selected from cobalt (II) and cobalt (III) chelates and combinations thereof.

11. The process of claim 1 further comprising decolorizing the polymer.

12. The process of claim 2 wherein the solvent is selected from ketones, alcohols, amides, ethers, glycol ethers, ethylene glycol, alkyl esters, mixed ester ethers, and supercritical fluids.

13. The process of claim 12 wherein the solvent is selected from acetone, butanone, pentanone, hexanone, isopropanol, dimethyl formamide, toluene, xylene, tetrahydrofuran, diethyl ether, monoalkyl ether-monoalkanoates, and supercritical carbon dioxide.

14. The polymer made by the process of claim 1.

15. A cationically crosslinkable composition comprising a polymer made by a process of claim 1.

16. A low VOC coating composition comprising a polymer made by a process of claim 1.

17. A high solids coating composition comprising the polymer made by a process of claim 1.

18. A pigment stabilizer comprising a polymer made by a process of claim 1.

19. A dispersant comprising a polymer made by a process of claim 1.

20. A polymeric chain transfer agent comprising a polymer made by a process of claim 1.

21. A process comprising functionalization by hydrocyanation, hydroamination or hydration of a polymer made by the process of claim 1.

22. A product of the process of claim 21.

23. The process of claim 1 wherein the chain transfer catalyst is selected from cobalt porphyrins and substituted cobalt porphyrins.

24. The process of claim 23 wherein the chain transfer catalyst is a complex having the structure:

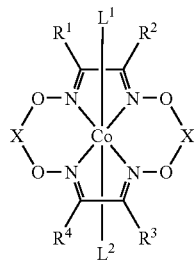

wherein X is hydrogen or $BR^{20}R^{21}$;
wherein $R^{20}$ and $R^{21}$ are each independently selected from unsubstituted and
substituted aryl, unsubstituted and substituted $C_1$-$C_{50}$ alkyl, unsubstituted and
substituted $C_1$-$C_{50}$ alkoxy, unsubstituted and substituted aryloxy, and
halogens;

wherein $R^1$, $R^2$, $R^3$ and $R^4$ are each independently selected from aryl, substituted aryl, alkyl, substituted alkyl methyl, ethyl, or —$(CH_2)_4$—;
wherein cobalt is in the divalent state or trivalent state;
wherein when cobalt is in the divalent state, $L^1$ and $L^2$ are neutral ligands or one or both are absent; or
wherein when cobalt is in the trivalent state, $L^1$ is an organic radical, and $L^2$ is a neutral ligand or is absent.

25. The process of claim 24 wherein X is hydrogen or $BF_2$, wherein $R^1$, $R^2$, $R^3$ and $R^4$ are selected from phenyl, substituted phenyl, methyl, ethyl, or —$(CH_2)_4$—, wherein cobalt is in the divalent state; and
wherein $L^1$ and $L^2$ are chosen from water, amines, ammonia, nitrogen heterocycles, and phosphines, or one or both of $L^1$ and $L^2$ are absent.

26. The process of claim 24 wherein X is hydrogen or $BF_2$, wherein $R^{1-4}$ are each independently selected from phenyl, substituted phenyl, methyl, ethyl, and —$(CH_2)_4$—,
wherein cobalt is in the trivalent state;
wherein $L^1$ is an organic radical selected from isopropyl, 1-cyanoethyl, 1-carbomethoxyethyl and 1-carbo(2-methoxyethoxy)ethyl; and wherein $L^2$ is selected from water, amines, ammonia, nitrogen heterocycles, and phosphines, or one or both of $L^1$ and $L^2$ are absent.

27. A substantially linear polymer of meta- di(isopropenyl)benzene,

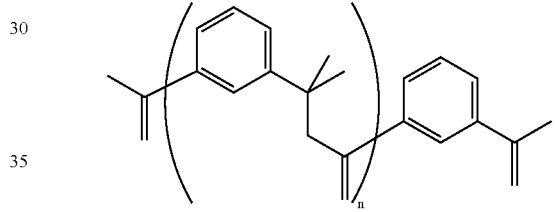

wherein n is an integer of 2 or greater.

28. The process of claim 1 wherein n is an integer of 2 to 1000.

29. The polymer of claim 27 wherein n is an integer of 2 to 1000.

30. A composition comprising the polymer of claim 27.

* * * * *